June 1, 1926.  
D. W. BROWN  
1,586,603  
CORE FOR FORMING APERTURES IN MOLDED BLOCKS AND THE LIKE  
Original Filed Nov. 19, 1923
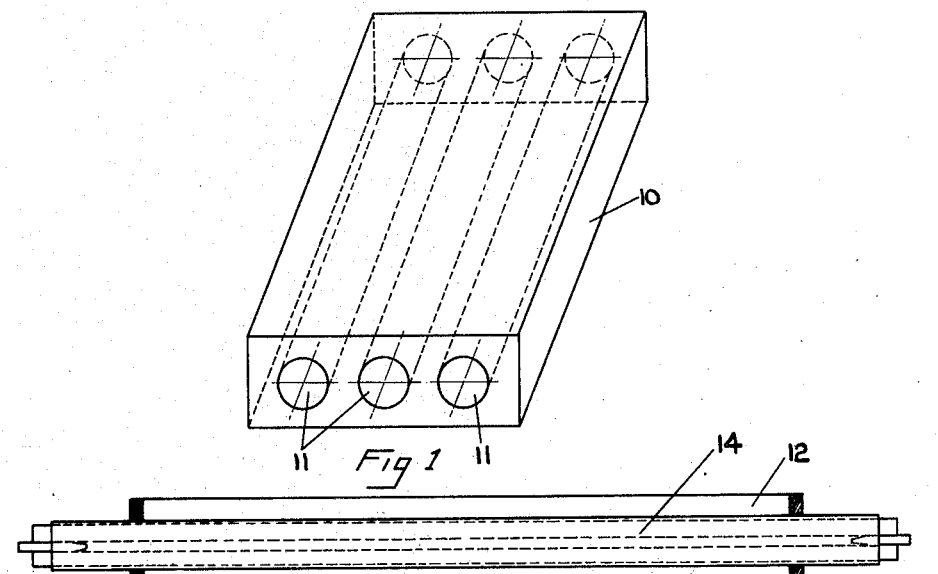
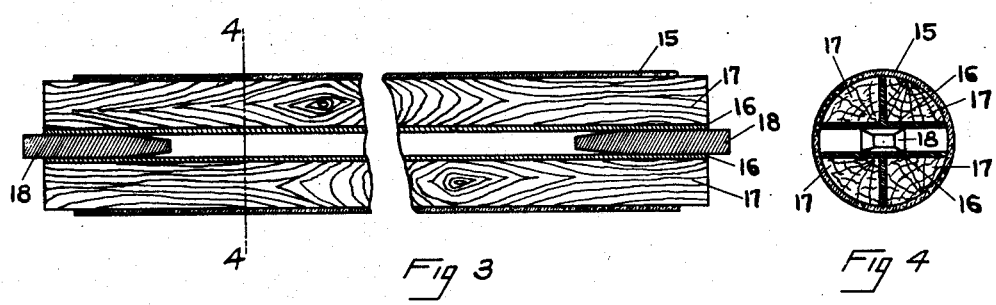
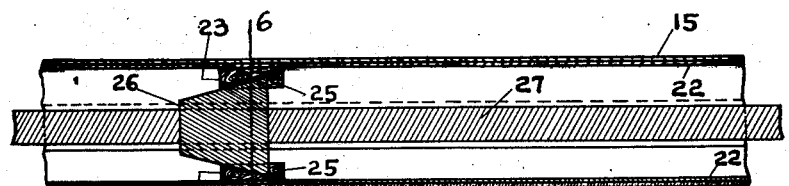
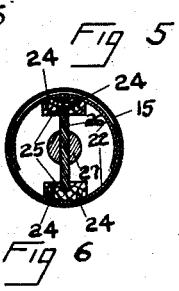
INVENTOR  
David Walker Brown  
BY  
Richey, Slough & Watts  
ATTORNEYS Patented June 1, 1926.

1,586,603

UNITED STATES PATENT OFFICE.

DAVID WALLER BROWN, OF AKRON, NEW YORK.

CORE FOR FORMING APERTURES IN MOLDED BLOCKS AND THE LIKE.

Application filed November 19, 1923, Serial No. 675,738. Renewed October 14, 1925.

This invention relates to cores for forming apertures in molded blocks and the like, which are formed of plastic material such as calcined gypsum, and other cementitious material.

In forming apertures in slabs, blocks and the like formed of cementitious material, it is customary to place cores of the desired shape in the proper relation in the mold prior to pouring. These cores are usually formed of wooden or other porous material, making the removal thereof impossible because of the strong adhesion of the molded material thereto when set. It is usual practice to grease such cores to permit the removal of the same when the molded material has set, but it is found that with this method strong pull or pounding is required to remove the core causing it to be short lived. The grease which is used permeates the pores of the wall of the aperture prohibiting the air from penetrating therethrough. Such permeation is undesirable, as a lighter finished product of better quality is economically formed when a greater surface is exposed to air while drying.

The object of my invention is to provide a core for forming apertures in articles molded of cementitious material which can be readily removed from an article which has set, leaving a clean wall around the aperture formed by the removal of the core.

Another object of my invention is to provide a core for forming apertures in plastic molded material including a shroud of substantially non-porous, elastic material which is expanded when placed in the mold, and which is permitted to contract after the molded material has set, the contraction of the shroud freeing itself from the adhesion of the hardened material.

Another object of my invention resides in the method which I employ to form apertures in molded slabs and similar articles.

These and other objects and the invention will appear in the following specification and will be set forth in the claims.

In the drawings forming a part hereof:

Fig. 1 is a perspective view of a slab having apertures extending therethrough such as I form with my improved core;

Fig. 2 is a sectional view of a mold with a core assembled therewith for forming the slab shown in Fig. 1;

Fig. 3 is a longitudinal sectional view of my improved core;

Fig. 4 is a transverse sectional view taken on line 4—4 of Fig. 3;

Fig. 5 is a longitudinal view of a core with a modified form of expanding member; and Fig. 6 is a transverse sectional view taken on line 6—6 of Fig. 5.

Referring to the drawings by characters of reference, 10 illustrates a finished cast slab, block or similar article which is molded of plastic material, such as calcined gypsum or similar cementitious material. This slab is formed with apertures 11 extending therethrough, and it is the formation of such apertures to which my invention relates.

The usual mold 12, as shown in Fig. 2, resting upon a rubber pad 13 can be employed to form such a plastic slab, and my improved cores 14 are preferably projected through the end walls of the mold.

These cores consist of a shroud or casing 15, and suitable means for extending the casing and forming a member capable of radial adjustment. Various agencies can be employed to meet such requirements and either compressed fluid, or mechanical pressure can be adopted, and for illustration I have shown two forms of mechanical devices for effecting the extension of the shroud. The shroud 15 is formed of material which is of such a nature and quality that it is substantially non-porous and flexible, to permit extension and retraction thereof. A canvas material having the interstices filled with a liquid celluloidal or other similar material could be used for such purpose, but I prefer to form the shroud 15 of a flexible rubber tubing, hose, or rubber fabric. I find that a rubber shroud has qualities which especially fit it for such purpose, which qualities are its toughness, resiliency and low adhesive bond to plastic material.

The adjustable member illustrated in Figs. 3 and 4 is comprised of two sections which include T-shaped reenforcing bars 16 and wooden fillers 17. The contour of the outer faces of the wooden fillers are rounded, each set forming substantially a semi-circular section. The shroud is placed around the two sections, extending short of the ends thereof, and the sections can be spaced apart by wedge members 18 which are pressed between the base portions of the T-bars at the ends of the adjustable member. In this manner the adjustable member is expanded to substantially the size of the aperture desired in the finished molded product, the rubber shroud being distended, or expanded by such separation of the base sections. When in such condition, the core is preferably projected through the mold and the cementitious material is poured into the mold embedding the core therein. If desired the sections of the heart may be separated after the core is placed in position within the mold.

When the plastic material has set the mold and the core are removed therefrom. By total or partial release of the forces tending to separate sections, these sections tend to return to abutting relation, permitting the rubber shroud, due to its resiliency to contract, the contraction of which causes it to free itself from the adhesive bond of the plastic material therewith. The core comprising the contracted shroud and adjustable member can be easily pulled from the aperture which it has formed. The wall of the aperture, in the set material, is free from any coating and is in its normal condition ready to permit drying air to contact therewith.

In Figs. 5 and 6 I have illustrated a modified form of core, the casing 15 being the same in all respects as that previously described. In this instance a substantially round core shell is formed of two partly circular longitudinal sections 22, which have a portion of their sides overlapping in nested relation. Oppositely disposed bearings 23 are secured by screws 24 or similar means to the inner walls of the sections and are provided with slots 25 which extend angularly and longitudinally in the inner faces thereof. The slots 25 are arranged to receive a wedge shaped spreader 26 which is secured to a movable rod 27. The movement of such rod longitudinally within the core shall, with the wedge spreader in the angular slots in the bearing cause the sections 22 to be spaced as desired, forming a core of larger or smaller diameter depending upon the direction in which the rod is moved. The rubber shroud extending around this core will be expanded when the core is extended and will contract when the diameter of the core is reduced, in the same manner as previously described.

Various changes may be made in the detailed construction described without departing from the spirit of my invention and the scope of the claims.

What I claim is:—

1. A core for forming apertures in molded plastic material comprising a member formed in sections, a rubber casing exterior of said member, and means for changing the relation of said sections to distend and allow contraction of said rubber casing.

2. A core for forming apertures in molded plastic material comprising a member formed in relatively movable sections, a rubber casing surrounding said sectional member, and adjustable means for spacing said sections in desired relation.

3. A core for forming apertures in molded plastic material comprising a member formed in two units, each of said units including a T frame and wooden fillers on each side of the rib in said frame, a rubber fabric shroud surrounding said member, and adjustable wedges for spacing said units, the spacing of said units expanding said rubber shroud and permitting the same to contract when the space between said units is reduced.

4. A core for forming apertures in molded plastic material comprising a member formed of reenforced sections, a rubber shroud surrounding said member, and means for varying the positions of said member sections relative to each other.

5. A core for forming apertures in molded plastic material comprising in combination, a shroud of elastic material, a plurality of movable rigid members within the shroud, and means for moving said rigid members to stretch said shroud.

6. A core for forming apertures in molded plastic material comprising in combination, a shroud of elastic material, a plurality of rigid members in said shroud movable perpendicularly to the longitudinal axis thereof, and means for moving said rigid members to stretch said shroud.

In testimony whereof I have hereunto affixed my signature this 14 day of November, 1923.

DAVID WALLER BROWN.